(No Model.) 3 Sheets—Sheet 2.
J. PRATT.
TYPE WRITING MACHINE.
No. 470,704. Patented Mar. 15, 1892.
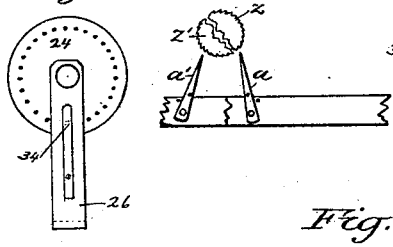
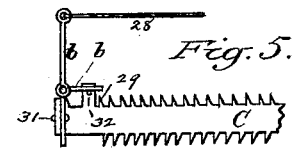
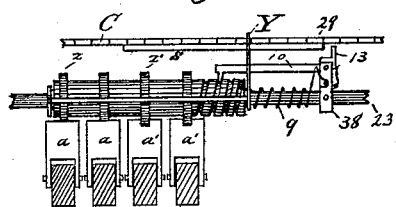
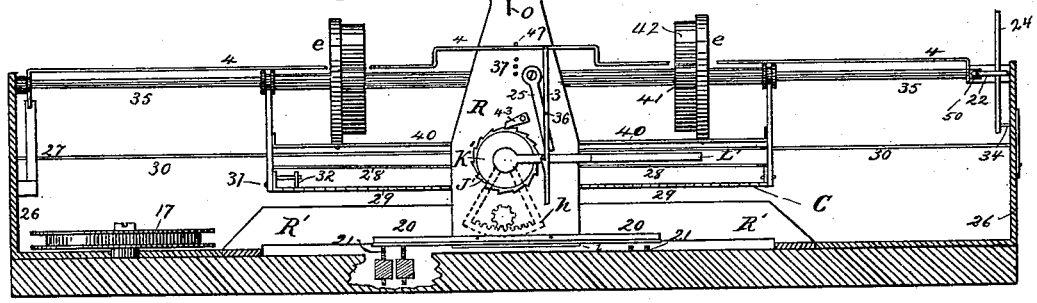
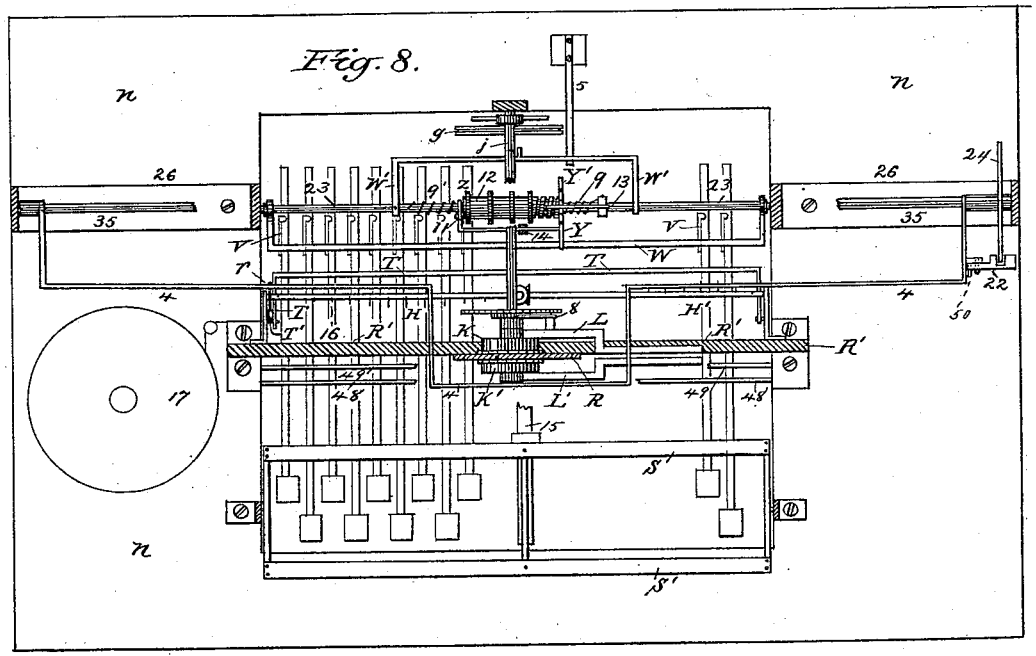
ATTEST:
A. N. Jasbera
J. J. Kennedy
INVENTOR:
John Pratt,
by Wm. C. Behrens.
Atty.

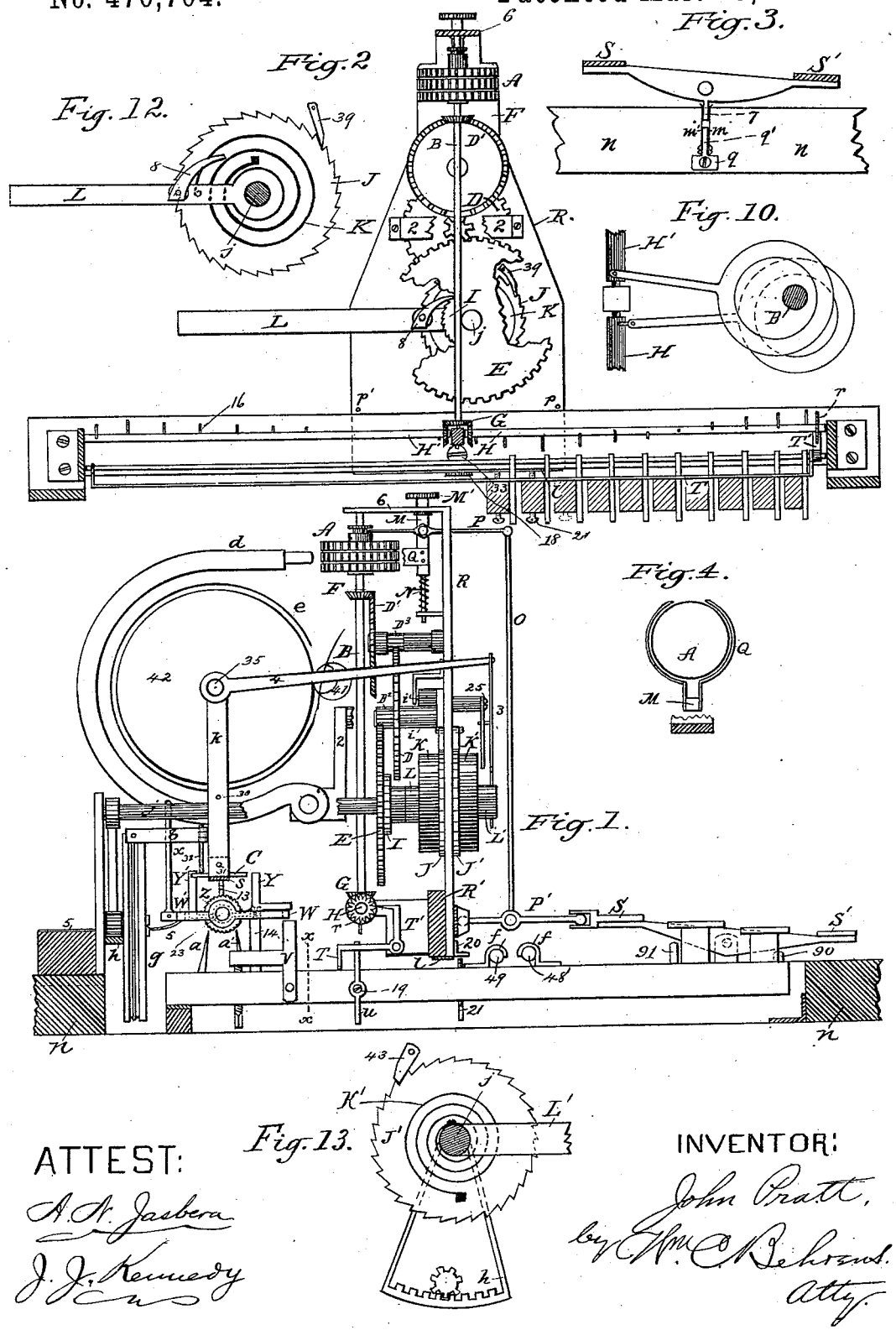

(No Model.) 3 Sheets—Sheet 3.
J. PRATT.
TYPE WRITING MACHINE.
No. 470,704. Patented Mar. 15, 1892.
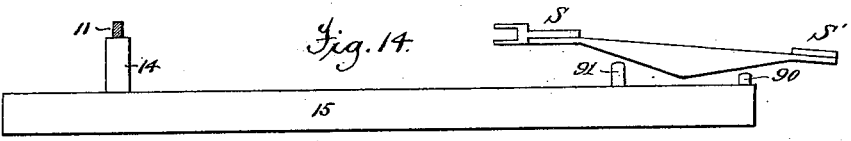
Fig. 14.
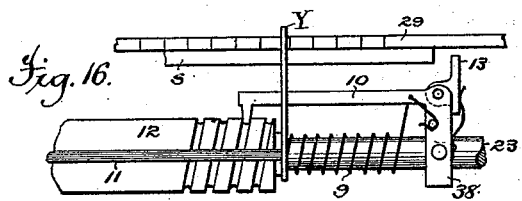
Fig. 16.
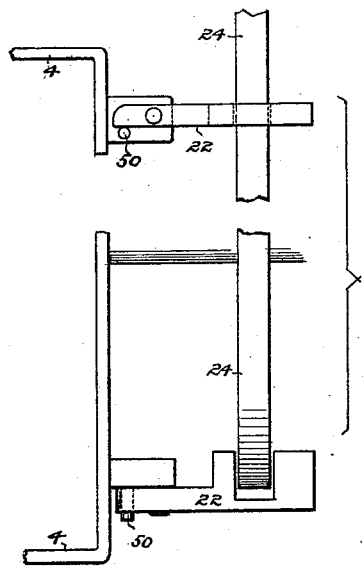
Fig. 15.
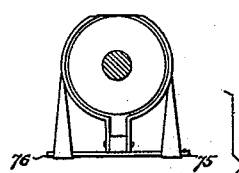
Fig. 17.
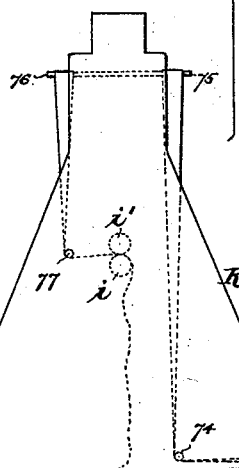
Fig. 18.
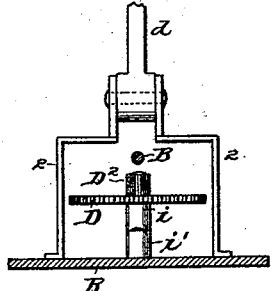
Fig. 19.
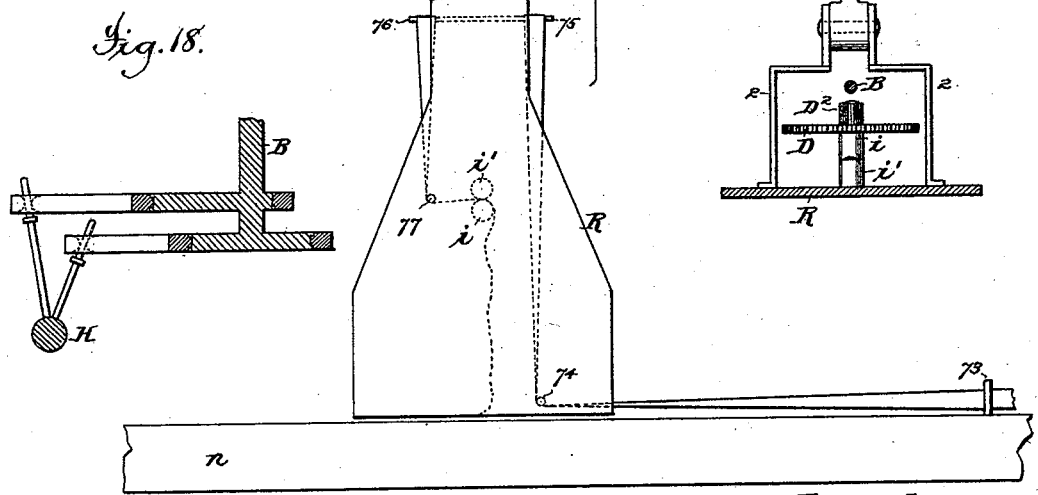
Attest:
Geo. H. Graham
Geo. H. Smith
Inventor:
John Pratt,
by Wm. C. Behrens
Atty.

UNITED STATES PATENT OFFICE.

JOHN PRATT, OF CENTRE, ALABAMA, ASSIGNOR TO THE HAMMOND TYPE WRITER COMPANY, OF NEW YORK, N. Y.

TYPE-WRITING MACHINE.

SPECIFICATION forming part of Letters Patent No. 470,704, dated March 15, 1892.

Application filed July 7, 1883. Renewed July 18, 1891. Serial No. 399,977. (No model.)

*To all whom it may concern:*

Be it known that I, JOHN PRATT, a citizen of the United States, residing at Centre, in the county of Cherokee and State of Alabama, have invented a new and useful Type-Writing Machine, of which the following is a specification.

The objects of my invention are, first, to construct a type-writing machine in which the springs for impelling the type-wheel and moving the paper-carriage may be rewound simultaneously with the retraction of the paper-carriage; second, to effect variable spacing by a combined movement to the right or left of paper-carriage and type-wheel in addition to the ordinary movements of said parts, as more specifically hereinafter described; third, to shift the type-wheel out of the range of the impression-hammer, so as to expose to view the last printed letter, and, fourth, to improve the machine generally in its several parts. I accomplish these objects by the several combinations of parts hereinafter described and claimed.

My invention relates to that class of type-writing machines in which the type-wheel is moved by a means or power independent of that of the finger-key levers.

In the accompanying drawings, Figure 1 is a side elevation of my type-writing machine with an inch or two of ends of case removed for lack of space and side of case removed to show key-lever; Fig. 2, a view of the standard carrying type-wheel mechanism, impression-hammer, and other parts viewed from rear of machine, parts of gearing removed to show parts behind; Fig. 3, a detached end view of the combined type-wheel shifting and spacing key; Fig. 4, a detached view of type-wheel and shell for guiding ink-ribbon; Fig. 5, a detached view of mechanism for releasing paper-carrier from escapement for returning said carrier; Fig. 6, a detached view of part of the variable spacing mechanism; Fig. 7, a half-size front elevation of machine with several parts omitted for the sake of clearness; Fig. 8, a half-size plan of machine, paper-carriage, type-wheel, and gearing removed to show parts beneath, operating-keys being omitted; Fig. 9, a detached view of another part of the variable spacing mechanism. Fig. 10 is a modification of the means for operating the stop-pin shafts. Fig. 11 is a detail view of a part of the line-space mechanism. Figs. 12 and 13 are detail views of levers L L' and their immediate connections. Fig. 14 represents the rocker-lever, spacing-key, and secondary rocker. Fig. 15 embraces enlarged views of the clutch and disk of the line-space mechanism. Fig. 16 is an enlarged view of a part of the variable letter-space mechanism, omitting the ratchet-wheels. Fig. 17 embraces views of the ribbon guiding and operating means. Fig. 18 is a view, partly in cross-section, of the modification for rocking the transverse shafts, the top view of same being shown in Fig. 10. Fig. 19 represents the bracket to which the hammer-arm is pivoted.

Similar letters and figures refer to similar parts throughout the several views.

The wooden case $n$ is a simple square frame having wires 48 49, extending across in such position as to place the key-levers flush with top, as shown. The key-levers, provided with hooks $ff$, are hung on said wires 48 49, as illustrated. Standard R is pivoted to standard R', as indicated at 33, (see Fig. 2,) so as to be capable of vibration thereon, the degree of movement being limited by pins $p\,p'$, co-operating with base-standard R'. (See Fig. 2.) The standard R is brought to its normal position by a strong spring $l$, secured to the base of R' and acting against R. The type-wheel A is mounted on a shaft B, journaled at top in bracket 6 of standard R and at bottom in bracket or stud of base-standard R'. The type-wheel has a sliding movement on its shaft sufficient to bring the upper and lower rows of types into alignment with the impression-hammer, the middle row being normally opposite the hammer. The type-wheel is moved on its shaft to bring its top or bottom rows of type into printing position by means of rocker-key S S', levers P P', and link O. Lever P is pivoted to standard R and lever P' is hung on piston-rod M and engages at its outer end a groove in the hub of the type-wheel. The rocker-key is returned to normal position by springs $m\,m'$, in manner hereinafter explained, and by means of the said link and levers operates to return the type-wheel to its normal position. The type-wheel is elevated or depressed, according as the rocker-key is rocked rearwardly or forwardly.

The rocker-key S S' is provided with a depending arm 7, which passes between the ends of two springs m m', attached to an upwardly-extending arm q' of a bracket q, fastened by a screw to the case n. By loosening this screw the arm q' can be adjusted so that the springs m m', acting on arm 7, will cause the type-wheel, through the key, link, and levers, to come to its proper normal position. When properly adjusted, the said screw is tightened.

The rocker-key is pivoted at each end to standards rising from the frame n, as shown in Fig. 8. One (or both) of the end cross-pieces of this rocker-key is provided with the depending arm, as before described. (See Fig. 3.)

Shaft B is square or slotted, and the type-wheel is formed to correspond, so as to slide on shaft but rotate with it. The type-wheel is rotated through the gearing shown, the main wheel E being driven by coiled spring K, acting immediately on pawled lever L, the pawl of which latter acts on ratchet-wheel I, fixed to and forming part of E. One end of spring K acts on lever L, (see Fig. 12,) while its other end is secured to ratchet-wheel J, held in position against the force of the spring by a pawl 39, pivoted to standard R. The tension of the spring K is varied as required by rotating the said ratchet-wheel J. The motion imparted to gear-wheel E is transmitted to the type-wheel shaft through the means of gear-wheels D, D', and F and pinions D² and D³. All these parts E I J K L turn on shaft j, but not with it.

Shaft B, through its bevel-gear G and the bevel-gears on stop-pin shafts H H', rotates said shafts. The stop-pins on these shafts are so located with reference to the position of the type on the wheel and that of the projections on the key-levers that the co-operation of these stop-pins with the projections of the key-levers will stop the spring-impelled type-wheel when the type corresponding to the operated key-lever is opposite the impression-hammer. The projections or pins u of the key-levers can be adjusted forwardly or rearwardly by loosening the screw 19, moving the projection u on the screw as a pivot to the desired position, and holding it in that position by fastening the screw; but lever T, through its detent T' (see Figs. 1 and 2) and spur-wheel r on shaft H, normally locks the train of gearing. This lever extends across all key-levers, and they all unlock and then arrest gearing. Two shafts H H' are preferred to one as giving bearings of gearing near ends of shaft and making it possible to employ light shafts; but I do not desire to limit myself to two shafts, as one may be employed. An equivalent arrangement is, instead of pinions, to employ two eccentrics at the lower end of shaft B, connected by connecting rods or pitmen with vertical arms of the shafts, and so oscillate them, instead of revolving them. As the shaft B revolves, the eccentrics will, by means of the rods connected with their rings and with the upwardly-extending arms of the shafts H H', rock said shafts, and these rock-shafts, properly geared to the type-wheel shaft and provided with pins properly located, will act in the same manner as the revolving shafts before described. The two eccentrics at right angles to each other, as shown in Fig. 10, would give always a sufficiently positive movement of one or the other rocker.

Upon the same shaft j, which serves as a bearing for lever L, lever L' is rigidly mounted and placed so as to be in the same plane with the former, so that both levers can be depressed together by one hand as if they were in fact one lever. Lever L', being fixed to the shaft, turns it against the force of spring K', which it partly winds up in being pressed down. One end of spring K' is fastened to the shaft j, (see Fig. 13,) while the other end is secured to ratchet-wheel J'. A pawl 43, pivoted to standard R, holds this ratchet-wheel, and by turning the latter the tension of spring K' may be adjusted. The spur-segment h is also fastened to shaft j and engages a cog-wheel on shaft of pulley g, (see Figs. 1 and 7,) around which passes and to which is fastened cord 28, connected to the paper-carriage k.

The escapement, which permits the spring K' to move the carriage to the left, consists of ratchet-bar C, fastened to the carriage, and the oscillating escapement Y Y', which engages said bar. The opposite ends of cord 28 are fastened one directly to the carriage and the other to lever b, which is hinged to the carriage. The inner end of bent lever b operates on a vertical pin 32, fastened to the rack, and tilts or swings the rack on its pivot or hinge 31. (See Fig. 5.)

In retracting for a new line lever L' is pulled down simultaneously with twin lever L, and the pulley, through bent lever b, (see Fig. 5,) deflects the ratchet-bar hinged as shown and so frees the engagement of escapement with rack-bar and allows the retraction, and when the movement of the carriage stops the rack-bar falls into place. The essence of this part of my invention resides in the position in which said two levers L L' are placed, so that they may be operated simultaneously and not in the specific construction of the spring-impelled mechanisms for moving the type-wheel and the carriage, and I do not, therefore, desire to limit myself in the claims relating to this part of my invention to the particular construction of spring-impelled mechanisms shown and described.

The oscillation of escapement Y Y' is effected through the hopper V of each key-lever and the front rocker W, which operates on the escapement Y Y' resting thereon, as shown in Fig. 8. The link x, connecting rear rocker W' and hammer, communicates motion to the latter, the former being moved by spring 5 at the close of the key movement. Rockers W and W' are fastened to the same rocker-shaft 23. Detent-lever T is preferably set so that its detent I unlocks type-wheel gearing a little before the key is fully depressed and the hammer-spring can operate so as to give the wheel a little the start of the hammer in the race for the impression-point; but the tension of the springs governing them may be adjusted relatively to each other to prevent the hammer striking prematurely. I have not deemed it necessary to show means for adjusting the tension of the hammer-spring, as any means to that end may be employed. Lever P has its bearings in a square piston-rod M, held to normal position by spring N. By pressing down button M' the type-wheel and ribbon are lowered and the last-printed letter or impression is disclosed to the operator. The essence of this part of my invention consists in constructing the type-wheel and its shaft so that the former can slide on the latter a sufficient distance to move it out of the field or range of the impression-hammer, and not in the particular means illustrated and described for transmitting the motion imparted to the finger key or button to said type-wheel, and I do not therefore desire to limit myself in the broad claim to this part of my invention to said means.

The interlinear feed mechanism is constructed as follows: The clutch 22 acts on the sides of the disk or wheel 24. The clutch-lever 22 is mounted on bail-lever 4 and is prevented from grasping the wheel 24 on the downward movement by the stop 50 on the bail-lever, (see Figs. 7 and 8,) on which it rests normally. The wheel 24 is provided near its periphery with indentations, with which the spring-click 34 engages to secure uniform line-spacing. (See Fig. 11.) This disk 24 is rigidly mounted on shaft 35 of paper-carriage. The clutch 22 operates to rotate the disk 24 the distance of one, two, or more of its indentations, as hereinafter described, and the spring-click 34 serves to hold the disk in place, except when the latter is moved by the said clutch.

Variety in the interlinear spacing is accomplished by the notched hanger 3, depending from bail-lever and engaged by a pin on lever L' and by an adjustable slide or incline 25. On pulling down lever L' the hanger is engaged and brings down the bail-lever 4 until pin 36 of hanger, impinging on the slide, disengages hook and the bail-lever is retracted upward to its normal position by spring 27. The clutch 22 is formed to take hold during this upward or return movement and to slide on the disk of the wheel when pulled down. The slip movement here described is adopted to limit the action of twin lever L' in operating the line-space mechanism without limiting it in winding the spring K' or in retracting paper-carriage. By depressing the levers L L', which can be done by one motion of the hand, the proper line-spacing is secured, the carriage retracted, and its operating-spring rewound, and also the type-wheel spring rewound. By this slip-action—i. e., by the disengagement of the notched hanger from the lever L'—both levers L L' can be farther depressed without affecting the spacing mechanism. Holes 37 are for insertion of pins to further define the downward limits of motion of lever 4, which is of use when it is desired to pull down lever 4 only without levers L L'. The upward motion of bail-lever 4 is arrested by pin 47 in standard R.

Concentric scrolls e encompass the rollers of the paper-carriage. Said scrolls are of steel and are fastened to the bar 40 of carriage, and serve as journals for the small opposing rollers 41, and also for springs to press the rollers together. Shaft 35 is either square or grooved lengthwise, and the large rollers 42 are mounted on a cylinder squared to correspond or furnished with a pin to slide in groove, so as to slide on shaft and revolve with it.

The end bars of the paper-carriage are pivoted to the sleeve or cylinder, which is arranged to slide without rotating on shaft 35, and the wire 30, which passes through said end bars, prevents disengagement of rack from escapement.

The ink-ribbon used in this machine is paper and intended to be used up from spool. The spool 17 is preferably placed on the right or left of keys, and the ribbon is brought in any convenient way around pins in standard R to change direction and around shell Q of type-wheel, then back again to standard R, and then between rollers $i\ i'$, one of which is shaft of gear-wheel D. When the ribbon-spool is arranged on the right-hand side of the machine, the ribbon may be guided to pass over pins or rollers 73, 74, and 75, (see Fig. 17,) then around shell Q, and in front of type-wheel, then over pins 76 and 77, and between rollers $i\ i'$, which feed the ribbon forward. The movement of the gearing being continuous in the same direction, ribbon is fed out as required.

The variable letter-space mechanism consists of a cylinder 12, having a screw-face and having a longitudinal sliding movability on shaft 23 of rocker W; of secondary rocker 11, carrying escapement Y and straddling the cylinder, so as to travel with it; of a bent jointed lever 38, hinged to and straddling shaft 23, having a pin on the end of the horizontal arm, which engages the threads of the screw-cylinder, and spring 9, which holds said lever in engagement with screw and also acts longitudinally and restores the cylinder and escapement to their normal position at the end of each line of work. Spacing mechanism further consists of standard R, spring $l$, arms 20, and key-levers controlling letters $m$, $w$, $l$, and $i$, (and any others corresponding to letters desired to be varied in spacing,) and their adjusting-pins 21; also the four ratchet-wheels Z, encircling and fixed to cylinder 12, pawls $a$ $a'$, one on each key-lever mentioned, and flange

*s* on the under surface of paper-carrier ratchet-bar. Two of the four ratchet-wheels have their teeth inclined in an opposite direction to that of the teeth of the other two, as indicated in Fig. 9, for the increase or decrease of spacing. The pawls $a$ $a'$ have broad ends, so that they may not be disengaged from the ratchet-wheels by the longitudinal movement of the cylinder, which movement will be less than the breadth of the pawls. (See Fig. 6.)

To secure variable spacing it is necessary to cause a given key-lever to increase or decrease the normal spacing for the type said lever controls both before and after the impression of said type. If the escapement Y Y' is moved by the key-lever in the same direction as the paper-carriage, the space is increased, and if in the opposite direction lessened; but only one space is increased or lessened before or after impression, according as the hammer strikes after or before the feed movement. I will show first how this first variation in spacing is made and then how supplemented. The key-lever pawls $a$ $a'$, of which there is one for each ratchet $z$, two acting on one side and two on the opposite side of cylinder 12, (see Figs. 6 and 9,) are normally retracted from the ratchet-wheels they control, leaving cylinder free to move in opposite directions. Key-levers controlling $m$ and $w$ operate through their pawls to rotate the cylinder and to move the escapement Y Y' with the paper-carriage, while the key-levers controlling $i$ and $l$ move the cylinder and escapement in the direction opposite to that of the carriage movement. In the first instance the carriage moves forward more than it would if the cylinder were not rotated, while in the latter instance it moves forward less, because the escapement has pushed backward the paper-carriage. The degree or extent of movement of escapement Y Y' in either direction is of course double what is needed for the spacing between that particular impression and the preceding one—in other words, enough for the increase or diminution of space both before and after the given letter. The next thing is to apportion this movement—that is, divide it in half and place the halves one before and the other after the given character. To do this the type-wheel and impression-hammer are moved. This is done by moving standard R, to which they are fixed. Standard R is held to a normal position by the spring $l$, flush with the under faces of standards R and R'. If moved to either right or left against the spring, it returns to normal position when released. Its movements are limited by check-pins $p$ $p$, (see Fig. 2,) and also by adjusting-screws 21 in the key-levers controlling it. (See Figs. 1 and 7.) These levers move standard by pressing up the arm 20, fixed to lower margin thereof. Now when levers controlling $m$ or $w$, which are placed on the right hand of standard, are operated the escapement moves with paper-carriage, allowing it to travel, say, one thirty-second farther than normal. The standard is tilted to the left, say, one sixty-fourth by the same keys, thus reducing the variations to one sixty-fourth. On releasing the keys the standard resumes its position, thus giving the one sixty-fourth variable spacing remaining over to the space behind the given letter, which thus has its spacing increased one sixty-fourth before and one sixty-fourth behind. In this way one key-lever is made to vary two spaces. In an analogous manner, when levers controlling $i$ and $l$ on the left of standard are operated the escapement goes back to the right one thirty-second, the standard to the right one sixty-fourth, and a like distribution is made of minus differential spacing. Of course the teeth of the ratchets $z$ must be very fine to secure accuracy and uniformity. The essence of this part of my invention resides in mounting the escapement so as to be capable of lateral motion to increase or decrease the normal forward movement of the carriage and in mounting the type-wheel so that it can be moved laterally, as described. These two elements, constructed and arranged to be movable in the direction set forth, constitute the essential parts of my variable spacing mechanism, and to these movement must be imparted by the operation of the key-levers. The particular mechanism illustrated and described intermediate the key-levers and said two so movable elements for imparting to them the necessary movements is not of the essence of the invention, and I do not therefore desire to limit myself in the broad claims pertaining to this feature of my invention to the particular construction of the intermediate mechanism shown and described. Since the frequency of use of the plus variable spacing will be greater or less than the minus, the escapement would soon change its position on rocker-shaft so as to cause great inconvenience or even obstruct the operation of machine. At the retraction of paper-carriage at the end of each line the flange $s$ of ratchet-bar strikes the end 13 of bent shifting-lever 10 and lifts its pin from thread of screw-cylinder, allowing spring 9 to draw or push cylinder, as the case may be, to its normal position. The bent shifting-lever is jointed, so that its vertical part may yield to movement of carriage to the left and fitted with a slight spring, as shown, which erects the vertical arm 13 in the way of flange in reverse movement of the carriage. The rocker-key S S rests on spacing-key lever 15, and this key-lever 15, Fig. 8, through finger 14, Fig. 1, actuates secondary or escapement-carrying rocker 11, which is kept pressed on rocker $w$ by spring 9' and, as is evident, is operated independently of $w$. The spacing-key lever is formed or provided with projections 90 and 91, acted upon by the rocker-key. Thus the escapement is moved without movement of the hammer. A wire 30, Fig. 7, passes across machine fixed to standards 26 and through a slot or hole in paper-carriage as a guide and support thereto.

Having thus described my invention, I claim—

1. In a type-writing machine, the combination, with two springs for operating, respectively, the type-wheel and paper-carriage, of two levers so placed that both may be operated simultaneously to rewind said springs, substantially as described.

2. In a type-writing machine, the combination, with the paper-carriage and the rack, of an escapement capable of being shifted to the right or to the left, substantially as described.

3. In a type-writing machine, the combination, with the paper-carriage and the rack, of an escapement connected with a movable support capable of being shifted to the right or to the left, substantially as described.

4. The combination of an impression-hammer with the type-wheel arranged to slide on its shaft and said shaft constructed to permit said type-wheel to be shifted longitudinally thereon out of the range or field of the impression-hammer for exposing to view the last-printed letter or character, substantially as described.

5. The combination, with the type-wheel and paper-carriage, of spring-impelled mechanisms, substantially as described, for moving said type-wheel and carriage and two levers so placed that both may be operated simultaneously to rewind the springs and retract the paper-carriage, substantially as described.

6. The combination, with the type-wheel and paper-carriage, of spring-impelled mechanisms, substantially as described, for moving said type-wheel and carriage and two levers mounted on one and the same shaft, so that both may be operated simultaneously to rewind the springs and retract the paper-carriage, substantially as described.

7. The combination, with the type-wheel, of a spring connected with an arm or lever, a pawl attached to said lever, a ratchet-wheel with which said pawl co-operates, and driving and intermediate gear wheels, substantially as described.

8. The combination, with the paper-carriage, of a spring connected with a shaft provided with a toothed sector, a pinion gearing therewith, a pulley, and a cord fastened at its opposite ends to said paper-carriage and passing around said pulley, substantially as described.

9. The combination, with the type-wheel and its shaft, of a spring-operated gearing for rotating said shaft and transverse shafts studded with pins and geared to and revolved by said type-wheel shaft, substantially as described.

10. The combination, with the type-wheel and its shaft, of a spring-operated gearing for rotating said shaft, transverse shafts studded with pins or projections and provided with a spur-wheel and geared to and revolved by said type-wheel shaft, and a transverse lever provided with a detent for engagement with the said spur-wheel, substantially as described.

11. The combination, with the key-levers and adjustable check-pins mounted thereon, of the transverse shafts studded with projections, substantially as described.

12. The combination, with the lever, as L, of the spring attached to and operating said lever, pawl, as 8, ratchet-wheel, train of gear-wheels, type-wheel and its shaft, and studded transverse shafts revolved by type-wheel shaft, substantially as described.

13. The combination, with the lever, as L', of shaft, as $j$, spring, paper-carriage, and mechanism intermediate said shaft and paper-carriage, substantially as described.

14. The type-wheel-shifting rocker-lever formed with transverse keys, as S S', and an arm or extension, in combination with two springs, as $m\ m'$, acting on two opposite sides of said arm to return the said lever to normal position, substantially as described.

15. The type-wheel-shifting rocker-lever provided with keys, as S S', and connected with the type-wheel, in combination with the spacing-lever acted upon by said shifting-lever, substantially as described.

16. The combination of type-wheel with rocker-lever having two finger-keys, as S S', and intermediate positive connections consisting of link and levers, whereby the type-wheel is shifted on its shaft to bring upper and lower type rows into range, substantially as described.

17. The combination, with the lever for retracting the paper-carriage, of a lever for rotating the rollers thereof, a rod connecting said levers, and an adjustable incline acting on said connecting-rod to disengage it from the retracting-lever for regulating interlinear spacing without limiting the movement of said retracting-lever, substantially as described.

18. The combination, with the carriage-retracting lever provided with a pin, of the bail-lever, the connecting-rod or hanger provided with a notch, and the adjustable arm or slide, substantially as described.

19. The combination, with the pressure-rollers of the paper-carriage, of the spring-scrolls in which the small rollers are mounted, the parts serving as a guide for the rolling of the paper and also as a spring for pressing together the opposing rollers, substantially as described.

20. The combination, with the paper-carriage and its pivoted ratchet-bar, of a lever for tilting said bar to disengage it from the escapement, a pulley, and a cord connected with the pulley and said lever, substantially as described.

21. The combination, with the large rollers mounted on a sleeve or cylinder arranged to slide on its shaft without rotating thereon, of the spring-scrolls secured to a cross-bar of the carriage and provided with the small rollers, substantially as described.

22. The combination, with the guided end bars of the paper-carriage, pivoted to the sleeve or cylinder and arranged to slide without rotating on its shaft, of the large rollers secured to said sleeve, the spring-scrolls attached to a cross-bar of the carriage, and the small rollers mounted thereon, substantially as described.

23. The combination of the end bars of the paper-carriage, pivoted to the sliding sleeve and arranged to revolve with its shaft, with the wire or rod for guiding said end bars, substantially as described.

24. The combination, with the ribbon-spool and type-wheel, of guides for the inking-ribbon, rollers for shifting the same, and type-wheel spring, lever, pawl, ratchet, gear-wheel, and pinion for operating said rollers, substantially as described.

25. The combination, with the screw-cylinder carrying an escapement and ratchet driving-wheels, of key-levers acting on said ratchet-wheels, a paper-carriage and its rack, and a pin for engagement with the screw-cylinder, substantially as described.

26. The combination, with a screw-cylinder carrying an escapement, of a hinged pin held in engagement with said cylinder by a spring, and a paper-carriage provided with a projection for disengaging said pin from the cylinder against the pressure of the spring on the return movement of the carriage, substantially as described.

27. The combination, with a screw-cylinder carrying an escapement, of a pin hinged to a stationary part and engaging the screw-thread of said cylinder and a spring for returning the latter to normal position when the pin is disengaged on the return movement of the carriage, substantially as described.

28. The combination, with a sliding screw-cylinder carrying an escapement, of a hinged pin consisting of two parts pivoted together and a paper-carriage provided with a projection, whereby the carriage may move forward without disengaging said pin, but will lift the same from the cylinder on its return movement, substantially as described.

29. The combination, with a screw-cylinder carrying an escapement and ratchet driving-wheels, of a spring-pressed hinged pin, a carriage provided with a rack and a disengaging projection, a hinged standard carrying a type-wheel and hammer, and key-levers arranged to rock said standard to the right or left and to act on said ratchet driving-wheels, substantially as described.

30. The combination, with the key-levers, the paper-carriage, the rack, and the escapement, the latter mounted so as to be capable of being shifted to the right or to the left, of mechanism, substantially as described, for shifting the escapement to the right and to the left, and a movable standard carrying a type-wheel and hammer and movable to the right and to the left by the key-levers, substantially as described.

31. The combination, with the screw-cylinder provided with ratchet driving-wheels, of the escapement, the spring-pressed hinged pin or arm for engagement with the cylinder, the escapement-operating lever, and the key-levers provided with pawls or projections for co-operation with the ratchet driving-wheels, substantially as described.

32. The combination, with the sliding screw-cylinder, the escapement, and its operating-lever, of the secondary lever connected to said escapement, and the spacing-key operating on said secondary lever, substantially as described.

33. The combination, with the two rocker-levers, as W and W', of the escapement, the hammer, its operating-spring, and the key-levers provided with hoppers, substantially as described.

34. The combination, with the key-levers, the paper-carriage, and the ratchet-bar, of the escapement connected with a movable support and mechanism, substantially as described, for shifting the position of said support and escapement, for the purpose specified, substantially as described.

35. The combination, with the key-levers, the paper-carriage, and the ratchet-bar, of the escapement connected with a movable support and mechanism, substantially as described, for shifting the position of said support and escapement both to the right and to the left, substantially as described.

36. The combination, with the type-wheel mounted on a support movable in two directions, of key-levers arranged to act on said support for the purpose of shifting the axis of the type-wheel in a direction transverse to said axis and in opposite directions from its normal position, substantially as described.

37. The combination, with the type-wheel mounted on a movable support, of key-levers acting on said support and operating to shift the axis of the type-wheel in a direction transverse to said axis and parallel with the carriage, substantially as described.

38. The combination, with the type-wheel and key-levers, of a pivoted standard carrying said wheel, said key-levers operating to oscillate said standard in a plane parallel with the paper-carriage, substantially as described.

39. The combination, with the type-wheel mounted on a movable support, of key-levers acting on said support and operating to shift the axis of the type-wheel in a direction transverse to said axis and parallel with the carriage, and means for returning said support to normal position, substantially as described.

40. The combination, with the paper-carriage, key-levers, and mechanism, substantially as described, between said carriage and key-levers for increasing or decreasing the extent of the forward movement of the carriage, of the type-wheel and impression-hammer mounted on a movable support acted upon by said key-levers to shift the said type-wheel and hammer to the right and to the left, as may be required, for the purpose of securing variable spacing, substantially as described.

41. The combination, with the type-wheel arranged to slide on its shaft and said shaft constructed to permit said type-wheel to be shifted longitudinally thereon out of the range or field of the impression-hammer, of means, substantially as described, for shifting said type-wheel out of said field or range for the purpose of exposing to view the last-printed letter or character, substantially as described.

42. The combination of the type-wheel and its shaft with rod M, lever P, and spring N, substantially as described.

JOHN PRATT.

Witnesses:
C. DANIEL,
R. R. SAVAGE.